United States Patent [19]

Faulstich et al.

[11] Patent Number: 4,902,175

[45] Date of Patent: * Feb. 20, 1990

[54] METHOD AND APPARATUS FOR DETERMINING THE ANGULAR POSITION OF A WORKPIECE AND POSITIONING THE SAME

[75] Inventors: Ingo Faulstich; Wolfgang Müller, both of Ludwigsburg, Fed. Rep. of Germany

[73] Assignee: Hermann Pfauter GmbH & Co., Ludwigsburg, Fed. Rep. of Germany

[*] Notice: The portion of the term of this patent subsequent to Apr. 14, 2004 has been disclaimed.

[21] Appl. No.: 935,949

[22] Filed: Nov. 28, 1986

Related U.S. Application Data

[63] Continuation-in-part of Ser. No. 649,914, Sep. 12, 1984, Pat. No. 4,657,447.

[51] Int. Cl.⁴ .................. B23Q 15/26; B23Q 17/00
[52] U.S. Cl. ...................... 409/12; 408/1 R; 408/71; 409/84; 409/198; 409/221
[58] Field of Search .............. 409/1, 11–24, 409/61, 62, 84, 131, 198, 221, 222, 223, 224; 318/568; 364/474; 408/1 R, 71

[56] References Cited

U.S. PATENT DOCUMENTS

| | | | |
|---|---|---|---|
| 3,152,422 | 10/1964 | Loxham | 409/15 |
| 3,254,566 | 6/1966 | Bradner | 409/2 |
| 4,208,718 | 6/1980 | Chung | 364/474 |
| 4,284,376 | 8/1981 | Papistok et al. | 409/24 |
| 4,329,096 | 5/1982 | Merscovici | 409/12 |
| 4,385,855 | 5/1983 | Papistok et al. | 409/24 |
| 4,657,447 | 4/1987 | Faulstich et al. | 409/12 |

FOREIGN PATENT DOCUMENTS

| | | | |
|---|---|---|---|
| 74659 | 3/1983 | European Pat. Off. | 318/568 |
| 1096719 | 1/1961 | Fed. Rep. of Germany | 409/11 |
| 2847027 | 9/1979 | Fed. Rep. of Germany | 318/568 |
| 524628 | 11/1976 | U.S.S.R. | 409/61 |

Primary Examiner—Z. R. Bilinsky
Attorney, Agent, or Firm—Becker & Becker, Inc.

[57] ABSTRACT

A method and apparatus for determining the angular position of a workpiece and for positioning the same relative to at least one tool. The workpiece has at least one set of teeth. Pulses are derived from a rotating reference workpiece and from a reference shaft which has a known gear ratio with the reference workpiece, and consequently also turns. A first phase measurement is undertaken between the pulses, the result of which is stored as the reference value. The reference workpiece is replaced with a workpiece which is to be machined and which is provided with teeth. A second phase measurement between the pulses of the refernece shaft and of the reference workpiece are undertaken in a second measuring operation. The reference value of the first phase meaasurement is compared with the result of the second phase measurement. The workpiece is turned relative to the reference shaft in conformity with the difference between the two measured values.

9 Claims, 5 Drawing Sheets

KNOWN APPARATUS

METHOD AND APPARATUS FOR DETERMINING THE ANGULAR POSITION OF A WORKPIECE AND POSITIONING THE SAME

This is a continuation-in-part of allowed parent application Ser. No. 649,914-Faulstich et al filed Sept. 12, 1984 now U.S. Pat. No. 4,657,447-Faulstich et al issued Apr. 14, 1987, and belonging to the assignee of the present invention.

BACKGROUND OF THE INVENTION

1. Field of the Invention

The present invention relates to a method of determining the angular position of a workpiece and positioning the latter relative to at least one tool, said workpiece having at least one set of teeth. The present invention also relates to an apparatus for carrying out this method. For the workpieces, the apparatus has a mounting support which is rotatably driven by a first drive mechanism. A reference shaft therewith is rotatably driven by a second drive mechanism. The first drive mechanism for the workpiece mounting support is provided with an angle measuring device that is connected to a computer.

2. Description of the Prior Art

For the subsequent machining of preliminarily toothed workpieces, for example following a hardening operation, it is necessary to position the workpiece in an exact angular position relative to the tool. This subsequent machining is effected, for example, by hobbing, such as with a hard metal peeler hobber, in a continuous hobbing or turning process. The tool and the workpiece rotate at a fixed and known gear ratio relative to one another. As a reference parameter for the angular position of the workpiece, the angular position of the tool spindle can be used in this case. The exact positioning of the workpiece relative to the tool is designated as centering. The workpiece and the tool must be positioned relative to one another in such a way that when the two sides or surfaces of the teeth of the workpiece are machined, in the ideal case, the same amount of material is removed from both sides. When the workpiece and the tool are not precisely aligned relative to one another, the teeth of the workpiece are not neatly or completely machined; i.e., more material is removed from one side of the teeth than from the other side. With the method of the aforementioned general type, the tool was up to now carefully manually moved into the preliminarily toothed gaps of the workpiece until the tool removed material from one of the surfaces. Subsequently, the tool was displaced in the direction of its axis and in the direction toward the opposite surface of the workpiece until the tool started to remove material from this other surface. The tool was then backed up by half of the amount of the displacement between the two engagement positions, so that the tool is disposed centrally between the two surfaces of the workpiece, and so that during the subsequent machining, approximately the same amount of material is removed from the two surfaces. This method is very complicated and imprecise, and is unsuitable for an automatically operating process. Other methods are also known for centering, according to which other relative movements between the tool and the workpiece are carried out. The common feature to all of these heretofore known methods is that the operator must observe the process very precisely, and must manually initiate the relative movement between the two engagement positions. Such processes cannot be automated.

An object of the present invention is to provide a method and apparatus of the aforementioned general types in such a way that the angular position of the workpieces can be simply and reliably determined automatically, and the workpiece can be automatically moved into the centering position; a first drive mechanism for the workpiece mounting support is provided with an angle measuring device that is connected to a computer.

SUMMARY OF THE INVENTION

The method of the present invention is characterized primarily in that in a first measuring operation, a measuring wheel having a tooth construction is made to mesh with a set of teeth of a reference workpiece; in that pulses are derived from the rotating measuring wheel and from a reference shaft which has a known gear ratio with the measuring wheel, and consequently also turns, between which pulses a first phase measurement is undertaken, the result of which is stored as the reference value; in that the reference workpiece is replaced with a toothed workpiece which is to be machined; in that, in a second measuring operation, a second phase measurement between the pulses of the reference shaft and of the measuring wheel is undertaken; in that the reference value of the first phase measurement is compared to the result of the second phase measurement; and in that the workpiece is turned relative to the reference shaft in conformity to the difference between the two measured values. Pursuant to one embodiment of the present invention, only one pulse is derived per revolution of the measuring wheel.

The apparatus of the present invention is characterized primarily by being provided with at least one measuring wheel which has a tooth construction and which can be moved toward the mounting support transverse to the axis of rotation thereof; in that a respective angle measuring device is associated with the second drive mechanism and with the measuring wheel; and in that the angle measuring devices are connected to a computer, the output of which is connected via an amplifier and at least one control line to the first drive mechanism.

With the inventive method, the angular position of the workpiece is automatically determined using a reference workpiece. The reference workpiece is centered "by hand" pursuant to the above described method, and is then finish machined if necessary by a finishing operation of the tooth construction. The reference workpiece then corresponds completely to the finish-toothed workpieces which are to be produced. As the reference shaft turns, and as the reference workpiece turns, pulses are derived from the reference shaft and from the reference workpiece; a first phase measurement is undertaken between these pulses. The measured value determined thereby is stored and serves during the subsequent measurement of the workpieces which are still to be machined as a reference value. Subsequently, the angular positioning of the workpieces which are to be machined, and which correspond to the reference workpiece, can be undertaken very easily. The same measurement is undertaken with each workpiece which is to be machined; i.e., a further phase measurement between pulses of the reference shaft and of the workpiece is undertaken. A comparison of the results of the two phase measurement makes it possible to establish which position the workpiece to be machined has relative to the reference shaft. Since, during the determination of the reference value, the reference shaft was precisely positioned relative to the reference workpiece, the reference value is a measure for the precise positioning of the reference workpiece relative to the reference shaft. If with the workpiece which is to be machined, a measured value is determined which differs from the reference value, the workpiece need only be turned relative to the reference shaft to such an extent until this measured value coincides with the stored reference value. The workpiece which is to be machined then assumes exact position thereof relative to the tool. If, for example, the teeth of the workpiece are to be machined, the workpiece in this manner very easily, and within only a few seconds, can be brought into the exact position relative to the tool, so that when a tooth is machined, approximately the same amount of material can be removed from both sides of the tooth of the workpiece.

The inventive apparatus is characterized by a structurally simple arrangement, which makes possible a simple and rapid determination of the angular position of the workpiece relative to the reference shaft. The reference workpiece and the workpiece which is to be machined can be alternately mounted on the mounting support for the workpiece. The pulses delivered by the angle measuring devices are introduced to the computer connected thereto; the measured value is formed in this computer, and is compared with the reference value. A control signal can then be delivered via the control line from the computer via the amplifier to the drive mechanism of the workpiece mounting support, or of the tool, so that the workpiece can be brought into the desired relative position in conformity with the signal. The inventive method and the inventive apparatus are particularly suitable for mass production on complete NC (numerically controlled) machines, because such machines normally are already equipped with measuring systems, for example to detect the rotation of the reference shaft and the workpiece mounting support, a suitable table drive, and possibly even a computer which can carry out the calculations which are necessary for the present invention.

Pursuant to further specific embodiments of the apparatus of the present invention, the measuring wheel can be disposed on a carriage which can be moved transverse to the axis of rotation of the mounting support for the workpiece. Movement of the carriage may be effected with an adjustment device which can be a piston-cylinder unit having a piston rod which engages the carriage.

The first drive mechanism for the workpiece mounting support may be provided with an angle measuring device which is connected to the computer. If the tool can be moved in the direction of X, Y, and Z axes relative to the workpiece mounting support by means of an adjustment device, the latter may be provided with a position measuring device, preferably an angle measuring device, which is connected to the computer. The measuring wheel and the workpiece may have the same number of teeth.

BRIEF DESCRIPTION OF THE DRAWINGS

This object, and other objects and advantages of the present invention, will appear more clearly from the following specification in conjunction with the accompanying drawings, in which.

DESCRIPTION OF PREFERRED EMBODIMENTS

Figure 1:
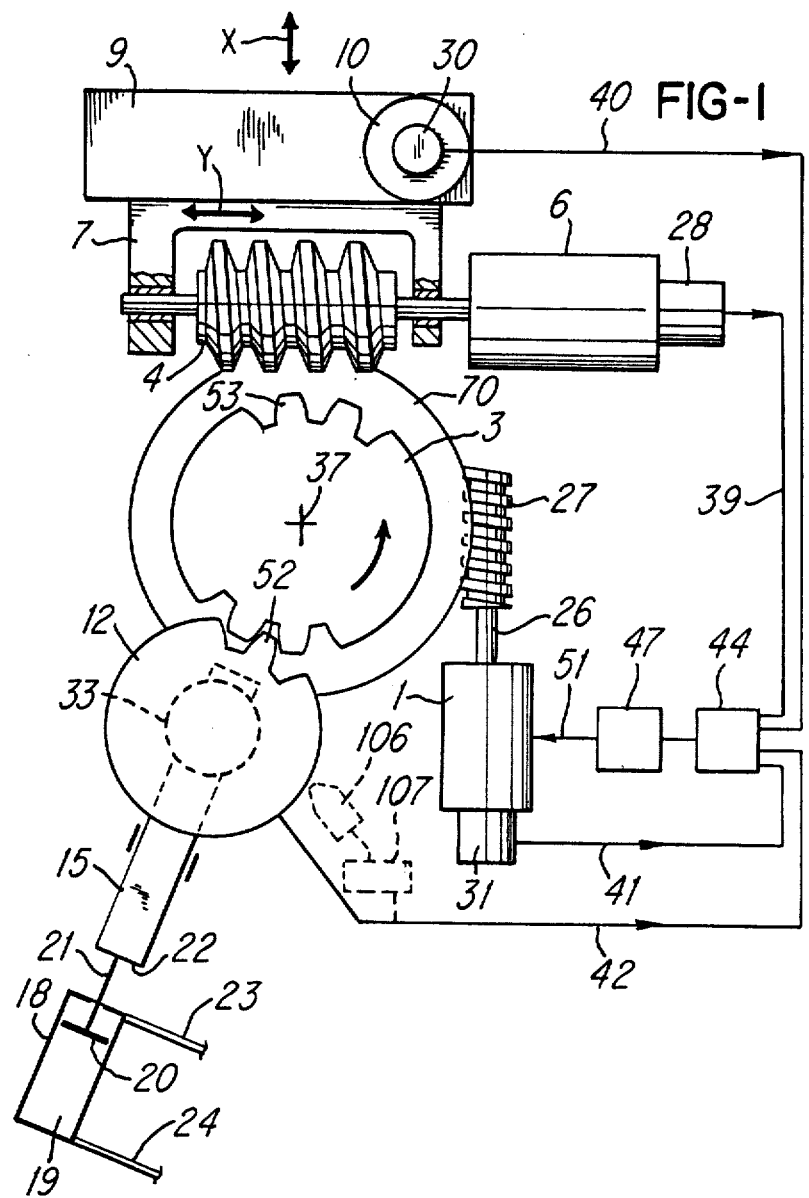
FIG. 1 is a schematic illustration of one embodiment of the inventive apparatus.

Referring now to the drawings in detail, the apparatus illustrated in FIG. 1 can determine and fix the position of the teeth to the tool. In the illustrated embodiment, the machining apparatus is a numerically controlled or NC hobbing machine.

Figure 2:
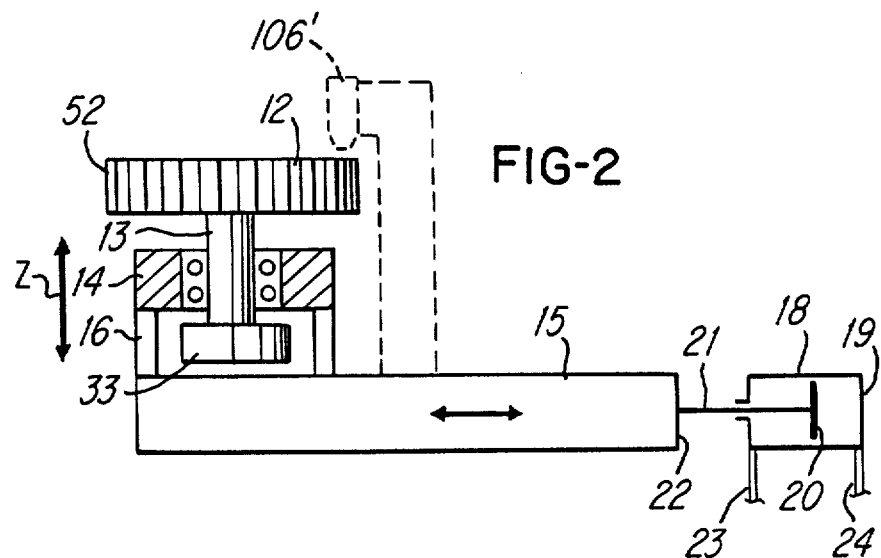
FIG. 2 is a schematic illustration, partially in section and partially in plan, of a side view of a portion of the apparatus of FIG. 1.
Figure 3:
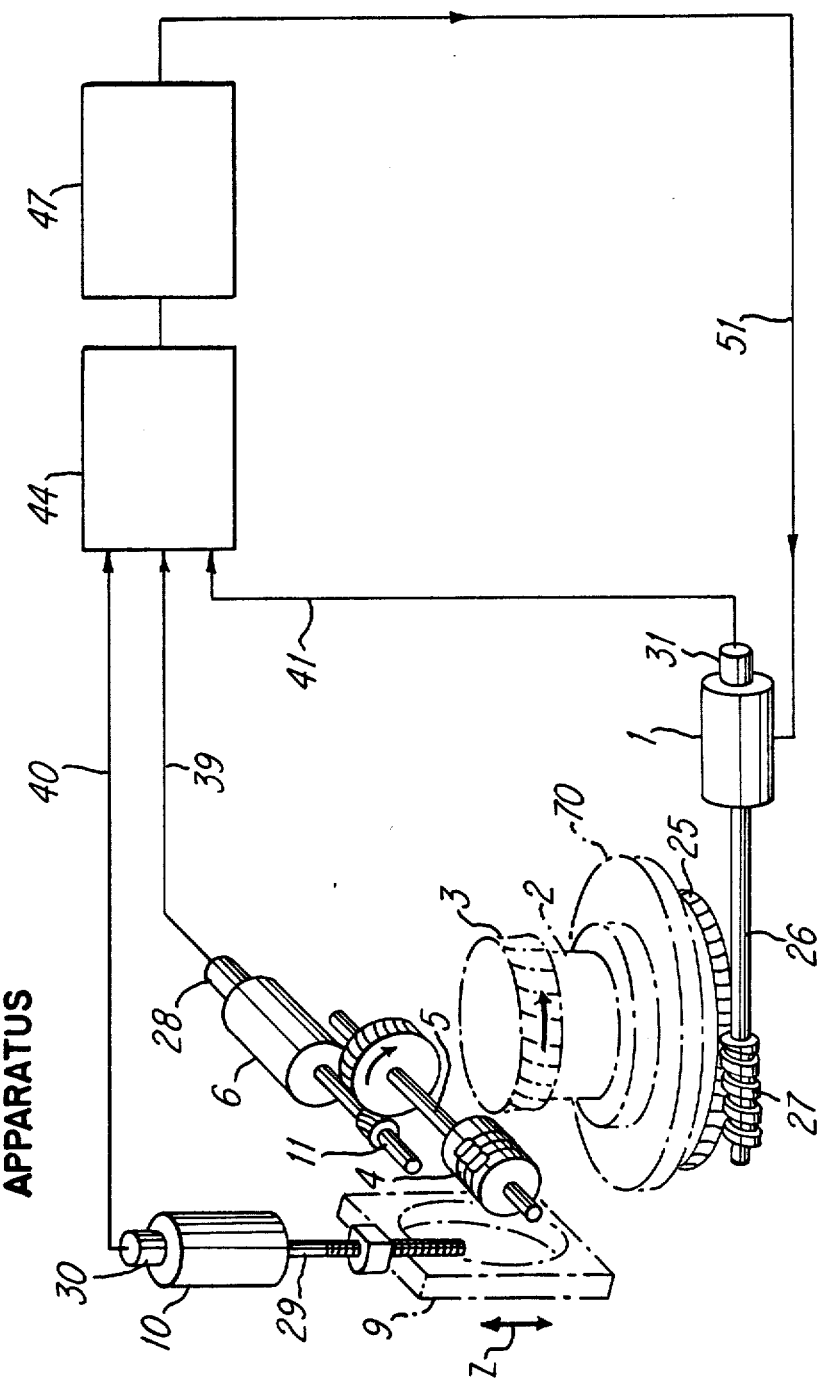
FIG. 3 schematically illustrates the drive mechanism of a workpiece mounting support, and a tool, of a known apparatus.

The apparatus illustrated in FIGS. 1 to 3 has a table 70 which can be rotatably driven by a drive mechanism 1, and on which can be clamped a gear wheel 3 which is to be machined. A machining tool 4, in the illustrated embodiment a hob, can be fed radially relative to the workpiece 3, and is disposed on a drive shaft 5 which is driven by a motor 6. The drive shaft 5 is rotatably mounted in a tangential carriage 7, which together with the motor 6 can be moved in the direction Y (FIG. 1) tangentially relative to the workpiece 3. The tangential carriage 7 is displaceably guided on a axial carriage 9, which can be moved at right angles to the plane of the drawing in the direction of the axis of the workpiece 3 (the direction Z in FIG. 3). A motor 10 is provided in the axial carriage 9 for driving the same. In addition, the unit comprising the tangential carriage 7 and the axial carriage 9 can be displaced in the direction X (FIG. 1) at right angles to the tangential direction of displacement and the axial direction of displacement, that is radially relative to the workpiece 3, in order thereby to be able to alter the distance between the workpiece 3 and the tool 4. A measuring wheel 12 is disposed on a vertical shaft 13 (FIG. 2), which is mounted in a bearing block 14. The bearing block 14 is disposed at a distance above a carriage 15 and connected therewith via spacers 16. In order to displace the carriage 15, a drive mechanism 18 is provided which can be in the form of a piston-cylinder unit. This drive mechanism has a cylinder 19 having displaceably disposed therein a piston 20 having a piston rod 21. The piston rod 21 engages one end face 22 of the carriage 15. Pressure lines 23 and 24 are connected to the cylinder 19 and are supplied and controlled via a known hydraulic arrangement, so that the piston 20 can be moved in both directions. The drive mechanism 18 can be hydraulically, pneumatically, or hydropneumatically controlled. However, the drive also can be effected for example by an electric motor having a screw mechanism.

The table 70 is provided with a worm gear 25 (FIG. 3), engaged by a worm gear 27 which is disposed on a shaft 26 of the drive mechanism 1. The drive mechanism 1 is preferably a direct-current motor. In order to detect the angular position of the tool 4, an angle measuring device 28, preferably an angle pitch emitter, is disposed on the main spindle 5. However, as shown in FIG. 3, the angle measuring device 28 can be disposed on a shaft 11 having a fixed gear ratio relative to the main spindle 5. The axial carriage 9 can be adjusted via a threaded spindle 29 which is disposed in the direction Z (FIG. 3), and supports an angle measuring device 30, preferably an angle pitch emitter, with which the angular position of the threaded spindle 29 ca be detected and hence the axial position of the carriage 9 in relation to the workpiece 3. To detect the angular position of the rotary table 70, and hence of the workpiece 3, there is provided a further angle measuring device 31, preferably an angle pitch emitter, which is disposed on the worm shaft 26. The measuring wheel shaft 13 (FIG. 2) is provided with an angle measuring device 33, preferably an angle pitch emitter, with which the angular position of the measuring wheel 12 can be detected.

Because of the known transmission between the rotary angles of the measuring wheel 12 and the workpiece 3 respectively reference workpiece, there is possible from the angular position of the measuring wheel to conclude specifically and unequivocally upon the angular position of the workpiece.

In the simplest case, the angle measuring device can be replaced by a limit switch which is actuated once per revolution of the measuring wheel. However, this particularly simple solution has the drawback that the measuring process takes somewhat longer, because only one measured value can be detected per revolution of the measuring wheel.

The angle measuring device for detecting the position of the measuring wheel 12 also can be realized subject to employment of contactlessly-operating or non-contact sensor 106, 108, a signal of this sensor 106, 108 is converted in a converter unit 107 into impulses with a resolution of for example one impulse per tooth of the measuring wheel 12 (FIG. 1). The impulses reach a computer 44 via a line 42.

All of the measuring devices 28, 30, 31, and 33 are connected via lines 39, 40, 41, and 42 with the computer 44. The computer 44 connected with the drive mechanism 1 for the worm shaft 26 subject to interposition of an amplifier 47.

The apparatus illustrated in the exemplary embodiment is used, among other things, for providing teeth or gears on preliminarily toothed workpieces 3 in a continuous hobbing or generating process. The workpieces are machined by the tool 4, which is placed in the required angular position relative to the workpiece. Then, for example during several revolutions of the workpiece 3, the tool 4 removes material from the surfaces or sides of the teeth of the workpiece. In order to achieve an exact coordination of the turning of the workpiece 3 and the movements of the tool 4 to one another, the rotation of the drive shaft 5, taking into consideration the rotation of the threaded spindle 29 and hence the shifting of the axial carriage 9, is supplied to the computer 44 via the angle measuring device 28 (FIG. 3). Taking into consideration the design data, for example the number of threads of the tool 4, the number of teeth, the modulus and the angle of set of the workpiece 3, the computer 44 on the basis of the aforementioned signals from the tool and workpiece forms the desired value for the rotation of the table. Furthermore, the computer 44 obtains via the line 41, as an actual value, a signal from the angle measuring device 31 of the worm shaft 26. Taking into consideration the gear ratio between the worm gear 27 and the worm gear 25, this signal provides the actual value of the angular position of the table at any given time. As soon as a difference between the desired and the actual value of the angular position of the table results, the drive 1 is additionally turned via the control line 51 until the actual value again coincides with the desired value.

If the apparatus has a device for automatically changing the workpiece, use of this apparatus is possible fully automatically to carry out the subsequent machining of mass produced preliminarily toothed workpieces.

Figure 4:
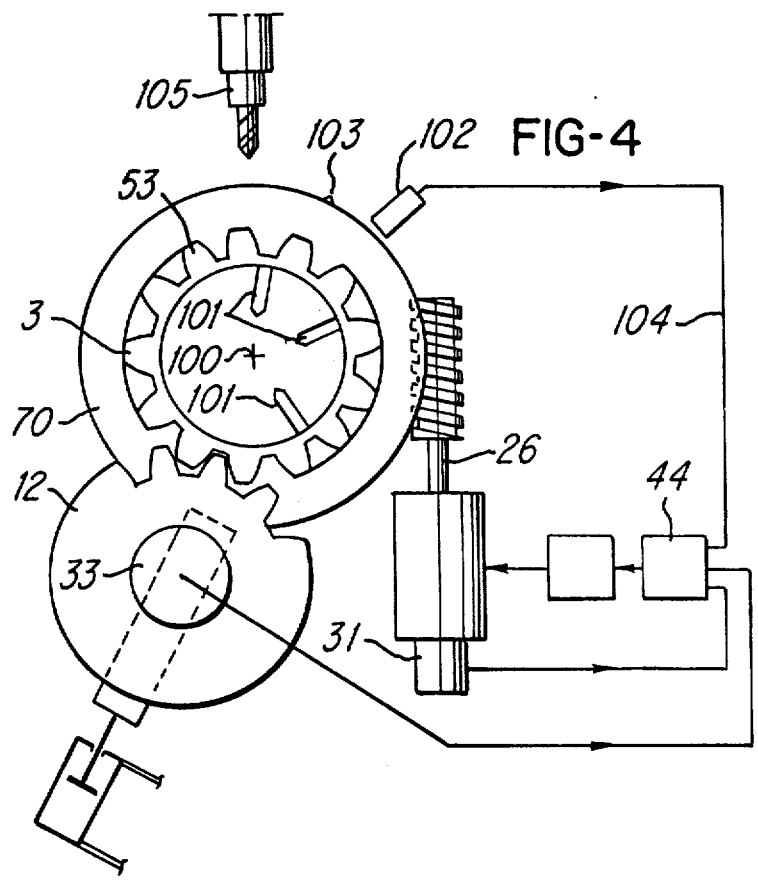
FIG. 4 is a schematic illustration of a second embodiment of the inventive apparatus.

Pursuant to the embodiment illustrated in FIG. 4, the reference shaft is the shaft 100 of the table 70. The task, for example, may be to provide one or more bores 101 or grooves at a specific angular position relative to the teeth 53 of a workpiece 3. If the teeth 53 are always accommodated in the same angular position relative to the table 70, it is merely necessary to always move the table in the same angular position for the machining. This task can be realized with known means, for example using an angle measurement system to detect the absolute angular position of the table. For this purpose, FIG. 4 shows the provision of the indirect incremental angle measuring system 31 on the worm shaft 26 and a reference mark pick-up 102. Of course, a direct measuring system also can be utilized on the shaft 100.

The reference mark pick-up 102 is actuated when a reference mark 103 provided on the table 70 passes by; the reference signal is fed via the line 104 to the computer 44.

However, if the teeth 53 of the workpiece 3 do not always have the same angular position relative to the table 70, this position can be easily automatically determined by using the apparatus with the measuring wheel 12 and the angle measuring system 33, and can be taken into consideration during the positioning of the table 70 relative to the workpiece 3. A reference workpiece is manually positioned, a phase measurement is carried out between the reference pulse per rotation of the workpiece and a reference pulse per rotation of the measuring wheel, and the result is stored. The reference workpiece is replaced by the workpiece which is to be machined; a second phase measured is then carried out in the aforementioned manner. The difference between the results of the two phase measurements is the angle by which the teeth 53 of the workpiece 3 which is to be machined is shifted relative to the reference workpiece. This value is introduced into the computer 44 as the correction value for the positioning of the shaft 100 of the table 70. Thus here, too, a fully automatic operation is possible.

The workpiece 3 is no in the correct angular position relative to the machining tool, which is a twist drill 105 in the illustrated embodiment. It is also possible, in place of the twist drill, to utilize a form wheel, profile-grinding disc or a milling cutter to mill grooves or profiles.

Figure 5:
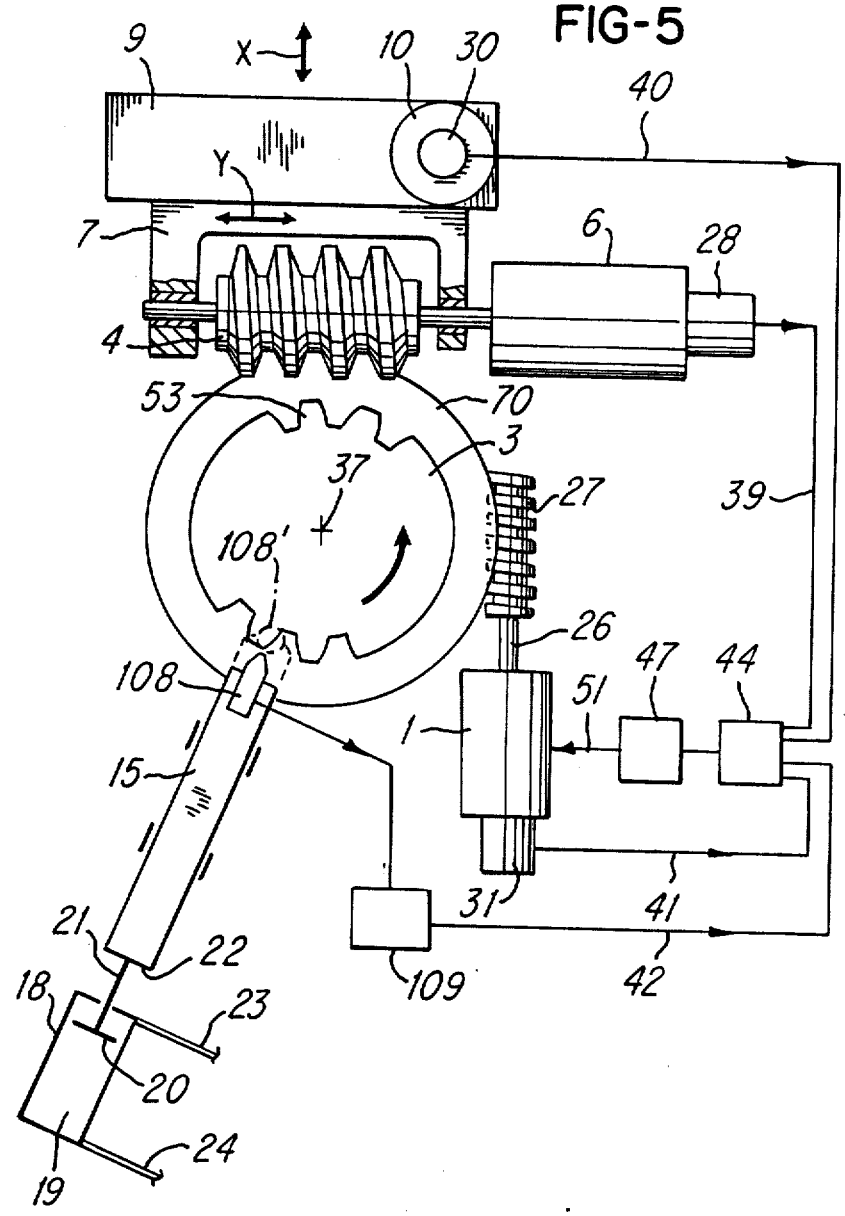
FIG. 5 is a schematic illustration of a third embodiment of the inventive apparatus.

The embodiment according to FIG. 5 differs from the embodiment according to FIG. 1 only thereby that, in place of the measuring wheel 12, the measuring device has a contactlessly-operating or non-contact sensor 108, which supplies an analogous signal of which the amplitude periodically changes with tooth-sequence frequency. This signal is converted in a convertor device 109 into impulses with for example one impulse per gradation or division and supplied to the computer 44 via the line 42.

First, as described, a reference workpiece is positioned and worked or processed "by hand" or manually. From the turning or rotation of this reference workpiece there are derived the aforementioned impulses. Position thereof is compared in the computer 44 with the position of the impulses which are derived from the reference shaft 5 and so there is thus formed and stored a reference measured value. Before working, processing or machining of the workpieces 3, position thereof is detected by the same method or procedure. The respective measured value is compared with the stored reference measurement value. The respective measured value is controlled or regulated to the amount of the stored reference measurement value via a relative rotation of the workpiece 3 to the reference shaft 5.

The contactless-operating or non-contact sensor 106' (FIG. 2) and 108' (FIG. 5) also can be so arranged, that these sensors touch the respective tooth construction or gear-tooth system front or facade (dotted or dashed lines in FIG. 2 and FIG. 5).

For determination of angular position of the workpiece, at least one information per rotation of the workpiece respectively of the measuring wheel 12 is necessary and required. The positioning accuracy can be increased when more informations per rotation are utilized, accordingly, for example, Z information per workpiece rotation, when Z is the tooth number of the workpiece. In this way it is possible via median value information to minimize influence of geometric deviations of the advance tooth construction or gear-tooth system (rotating or revolving offset or divergence, graduation, or divisional divergence) upon the centering position.

The present invention is, of course, in no way restricted to the specific disclosure of the specification and drawings, but also encompasses any modifications within the scope of the appended claims.

What we claim is:

1. A method of automatically and accurately determining an angular position of a workpiece, and positioning said workpiece, relative to at least one tool, said workpiece having at least one set of teeth; said method in sequence comprising the steps of:
    first determining the angular position of a reference workpiece manually centered, having the same set of teeth as the workpiece to be machined, using a measuring device;
    then providing a reference shaft which has a known gear ratio with said reference workpiece and consequently rotates when said reference workpiece rotates;
    deriving pulses from said reference workpiece and said reference shaft as both the reference workpiece and said reference shaft rotate;
    undertaking a first phase measurement between said pulses as a reference result;
    thereafter storing the reference result of said first phase measurement as a reference value;
    exchanging said reference workpiece by completely removing said reference workpiece that was taken for determining the reference value and replacing said reference workpiece with a further workpiece which is still to be finish machined subsequently thereto;
    undertaking a second phase measurement between further said pulses derived from said reference shaft and said further workpiece as both the further workpiece and said reference shaft rotate;
    comparing said stored reference value of said first phase measurement with the result of said second phase measurement to determine the difference between the first phase measurement and second phase measurement; and
    adjusting accurately the centering and angular positioning of said further workpiece quickly prior to machining said further workpiece by turning said further workpiece relative to said reference shaft in conformity to the difference between said reference value and said result of said second phase measurement so that subsequently the further workpiece is machined with the tool in a desired manner.

2. A method according to claim 1, including the step of providing said measuring device with at least one sensor, which furnishes pulses, which describe the angular position of said reference workpiece.

3. A method according to claim 2, including the step of equipping said measuring device with a measuring wheel, which is in mesh with said reference workpiece, and said sensor.

4. A method according to claim 1, including the steps of equipping said measuring device with a measuring wheel, which is in mesh with said reference workpiece, and also providing an angular encoder, which furnishes pulses, which describe the angular position of said reference workpiece.

5. A method according to claim 4, which includes the step of only deriving one pulse from said rotationally movable measuring wheel for each revolution thereof.

6. A method according to claim 3, which includes the step of only deriving one pulse from said rotationally movable measuring wheel for each revolution thereof.

7. A method according to claim 2, which includes the steps of forming a measured value by relying upon at least several teeth of respective tooth construction, respectively all teeth thereof; and
    determining optimum centering position via forming of a median value of deviation from predetermined positioning.

8. A method of automatically and accurately determining an angular position of a workpiece, and positioning said workpiece, relative to at least one tool, said workpiece having at least one set of teeth; said method in sequence comprising the steps of:
    first determining the angular position of a reference workpiece manually centered, having the same set of teeth as the workpiece to be machined, using a measuring device;
    then providing a reference shaft which has a known gear ratio with said reference workpiece and consequently rotates when said reference workpiece rotates;
    deriving pulses from said reference workpiece and said reference shaft as the reference workpiece and said reference shaft rotate;
    undertaking a first phase measurement between said pulses as a reference result;
    thereafter storing the reference result of said first phase measurement as a reference value;
    exchanging said reference workpiece by completely removing said reference workpiece that was taken for determining the reference value and replacing said reference workpiece with a further workpiece which is still to be finish machined subsequently thereto;
    undertaking a second phase measurement between further said pulses derived from said reference shaft and said further workpiece as the further workpiece and said reference shaft rotate relative to each other;
    comparing said stored reference value of said first phase measurement with the result of said second phase measurement to determine the difference between the first phase measurement and second phase measurement; and adjusting accurately the centering and angular positioning on said further workpiece quickly prior to machining said further workpiece by turning said further workpiece relative to said reference shaft in conformity to the difference between said reference value and said result of said second phase measurement so that subsequently the further workpiece is machined with the tool in a desired manner.

9. A method according to claim 8, which includes the step of only deriving one pulse from said measuring device including therewith a rotationally movable measuring wheel for each revolution of said rotationally movable measuring wheel.

* * * * *